May 24, 1960
M. S. WILSON
2,937,820
STRIP CHART RECORDER
Filed Oct. 3, 1955
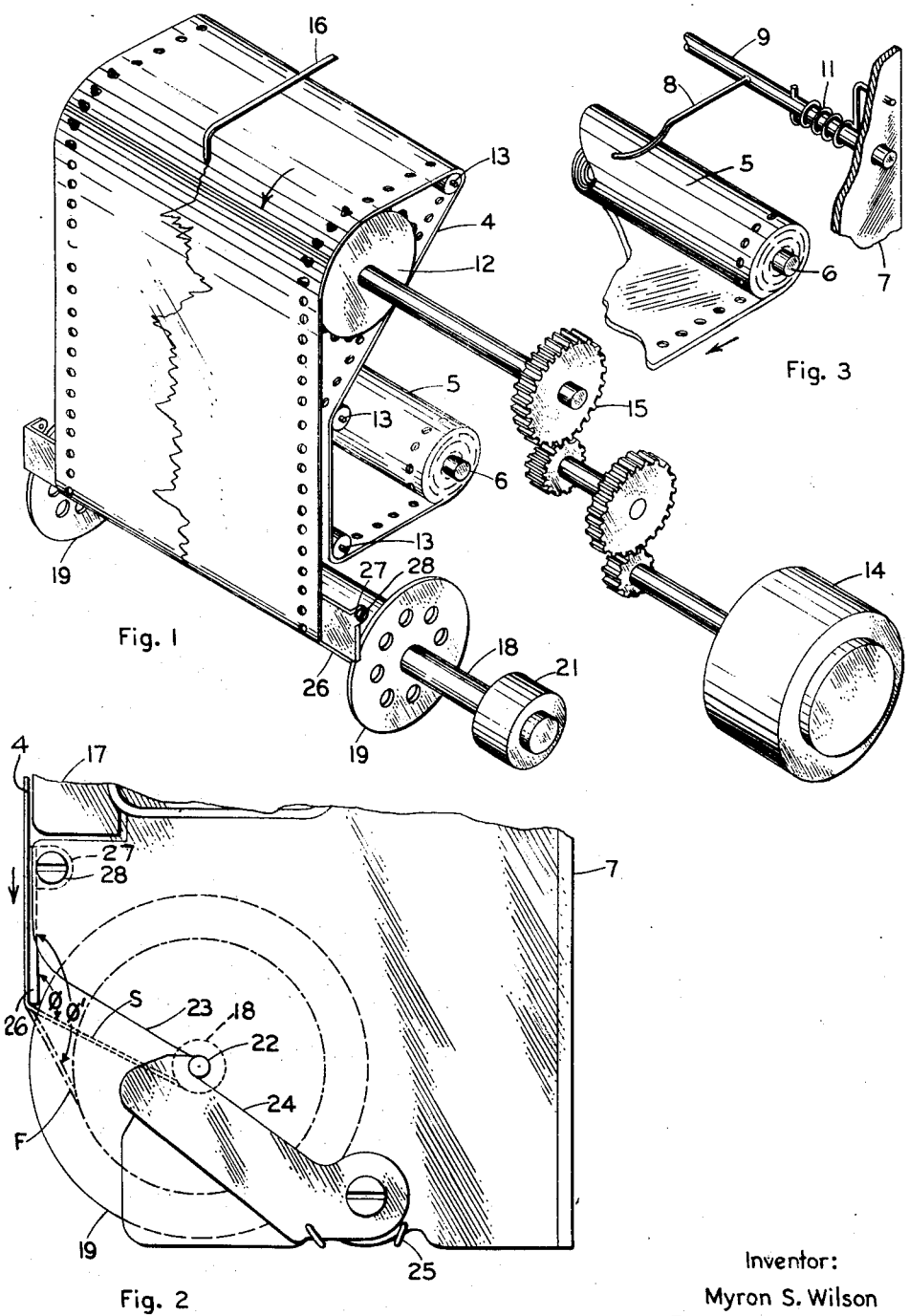
Inventor:
Myron S. Wilson
by, Richard E. Hosley
His Attorney

United States Patent Office 2,937,820
Patented May 24, 1960

2,937,820

STRIP CHART RECORDER

Myron S. Wilson, Lynnfield, Mass., assignor to General Electric Company, a corporation of New York Filed Oct. 3, 1955, Ser. No. 538,144

10 Claims. (Cl. 242—75.43)

This invention relates generally to strip chart recorders and in particular to improved means for automatically regulating the tension of the strip chart as it passes through the recorder.

In the design of strip chart recorders, the arrangement of the chart feeding components is of paramount importance to insure that the chart flows smoothly through the recorder at a precisely controlled rate, for otherwise the records so produced would not be reliable as a correct representation of the changes in the condition being recorded as they occur throughout the entire interval of recording. Such chart feeding components normally include the chart record itself which initially is formed into a supply roll, suitable means for rotatably mounting the supply roll so that the chart can be easily taken from the roll and fed through the remainder of the recorder, a time controlled chart advancing mechanism usually in the form of a timing drum for positively driving the chart through the recorder at a controlled rate, and a re-roll mechanism usually in the form of a suitably driven rotatably mounted spool upon which the chart can be wound upon completion of its travel through the recorder. In addition, such components usually embody suitable means for imposing a drag force on the supply roll so that suitable tension is maintained in the strip chart between the supply roll and the timing drum, and the re-roll mechanism is such that the torque furnished for winding the chart on the spool also maintains the chart under tension as it travels through the recorder subsequent to its engagement with the timing drum.

In order for the timing drum to positively and accurately advance the chart at a controlled rate, the forces imposed on the chart at the supply roll and at the re-roll spool must be co-related to each other and to the force imposed on the chart by the timing drum; for if these forces are not co-related, smooth and controlled flow of the chart through the recorder will be difficult to attain by virtue of the deleterious effects of possible slippage or tearing of the chart.

Normally, in prior recorders the drag force is constant and the force at the re-roll spool is relatively constant and at all times less than the force at the supply roll and this balance of forces has been found to promote smooth and accurate travel of the chart. However, such arrangements have only been effective when the total chart length was not much in excess of 60 feet. If it is desirable to increase the chart length substantially above 60 feet, the range in torque necessary to drive the re-roll spool gives rise to forces at the re-roll spool that greatly exceed the forces at the supply roll, thereby giving rise to possible slippage of the chart as it passes through the recorder. For example, in the case of a strip chart having a total available length of 150 feet for recording, the re-roll driving mechanism must be designed to provide high torque at the end of the recording cycle in order to turn the heavily loaded re-roll spool and still maintain some tension in the remainder of the chart coming through the recorder. Under such conditions, at the start of recording, when the re-roll spool is empty, the high torque that is necessary at the end of the re-roll operation is available at the start of re-roll and tends to drive the re-roll spool much harder than required and imposes a tension on the strip far in excess of the desired amount. This increased tension may tear the paper or it may cause the paper to slip past the timing drum, either of which is undesirable and renders the recorder useless for its intended operation. If the drag force is increased to compensate for their increase in tension at the beginning of re-roll, then at the end of re-roll the drag force will in all probability be so high that the paper will be torn by the timing drum as it attempts to unroll it from the supply roll. This latter condition would occur because the drag force would then greatly exceed the tension at the re-roll spool.

It is therefore an object of this invention to provide improved means for automatically regulating the tension of the strip chart as it passes through the recorder whereby smooth travel of the paper at a controlled rate is obtained.

It is another object of the invention to provide a tension regulating device in a strip chart recorder that responds directly to the tension in the chart and operates directly to regulate the effective torque producing the tension.

It is still another object of the invention to provide simple and inexpensive direct acting means to automatically regulate the tension of a strip chart in a recording mechanism.

Briefly, in one aspect thereof, the invention comprises a pivoted member in the form of an elongated rigid body extending across the strip chart for the full width thereof and located in close proximity to the spool used for re-rolling the chart. The elongated body has portions at its opposite ends that bear directly upon the flanges of the re-roll spool and develop a braking force thereon by virtue of the fact that the strip chart in its passage to the re-roll spool passes around the elongated body and pulls its opposite ends onto the spool flanges. The arrangement is such that at the beginning of the re-roll operation, the tension in the strip causes the pivoted member to exert maximum braking effect on the re-roll spool to thereby regulate the effective torque developed by the spool to wind up the chart. The braking reduces the effective torque and thereby reduces the tension on the strip chart and tends to maintain this tension at a magnitude that is less than the drag force on the chart at the supply roll.

As the chart is re-wound on the re-roll spool, the effective torque at the spool is utilized in a steadily increasing manner to rotate the steadily increasing weight of chart paper carried by the re-roll spool. Any excess torque tending to create excessive force or tension on the strip chart is effectively braked by the pivoted braking member, but the braking member is mounted in such a way that its regulatory effect is gradually diminished automatically as the re-roll spool continues to take up the strip chart. Near the end of the recording cycle when most of the chart is on the re-roll spool, the regulating effect of the braking member has been minimized to the point where little or no braking occurs, thereby making available all of the torque at the re-roll spool for turning the heavily laden spool and still maintaining some tension on the strip chart.

The elongated braking member is in the form of an elongated metallic strip readily manufactured by simple sheet metal fabricating techniques and easily assembled in the recorder at minimum manufacturing expense. In addition, the braking member can be readily located in the recorder without disturbing the arrangement or location of any of the other chart feeding components.

The arrangement is thus simple, inexpensive, and yet highly practical and reliable resulting in means for automatically regulating the tension of the strip chart to thereby provide smooth and accurate feeding of the chart through the recorder.

The objects of the invention, together with its advantages and benefits attendant thereto, will be more fully understood upon reference to the detailed description of the invention set forth below, particularly when taken in conjunction with the drawings annexed hereto in which:

Figure 1 is a perspective view of a more or less schematic showing of the chart feeding components normally utilized in a strip chart recorder including the novel tension regulating device forming the subject invention, and Figure 2 is an enlarged partial view of a portion of a commercial form of strip chart recorder of the type shown more or less schematically in Figure 1, in which the novel tension regulating device shown in Figure 1 is shown in cooperative relationship with its associated parts; and Figure 3 is a partial view of one commercial form of the arrangements utilized with the type of recorder shown in Figure 1 to provide a constant drag force on the chart supply roll.

Referring now to the drawings, it is seen that Figure 1 discloses a conventional overall arrangement of the chart feeding components normally found in a strip chart recorder comprising a strip chart 4 made from suitable recording paper and initially formed into a chart supply roll 5 suitably mounted on a shaft 6 which may be rotatably mounted on a main frame, a portion of which is shown in Figure 2 at 7. As shown in Figure 3, a drag force is imposed on the chart supply roll by means of the elongated rod 8 rigidly affixed to a shaft 9 which in turn is suitably journalled for rotation in the main frame 7. The shaft 9 is biased for motion in a counterclockwise direction by means of the small coil spring 11 having its inner end rigidly affixed to the shaft 9 and its outer end rigidly affixed to the main frame 7. Since the rod 8 is carried by shaft 9, the biasing of the shaft causes the rod 8 to bear against the chart supply roll and develop a drag force thereon that must be overcome if the chart is to be unwound from the roll. The rod 8 bears against the center of the supply roll and imposes a substantially constant drag force on the roll in view of the fact that the spring is tightly wound and operates over a relatively small angle.

The chart is drawn from the chart supply roll by means of a timing drum 12, there being a plurality of suitably guided rollers 13, all of which are rotatably mounted in the main frame 7 and serve to guide the chart as it passes from the chart supply roll onto the timing drum. It is noted that the chart has a plurality of perforations arranged along its outer edges and these perforations cooperate in a known manner with a series of sprocket-like projections circumferentially arranged around the outer ends of the timing drum 12 to permit the chart to be advanced through the recorder. As indicated in the drawing, the drum is rotatably mounted and is driven by a suitable clock mechanism which in the form shown in the drawings comprises a suitable constant speed electric motor 14 coupled to the timing drum by means of a suitable gear train 15. The motor 14 turns the drum at a controlled rate so that the strip chart travels through the recorder at a controlled rate. The rate can be changed as desired in a known manner by simply rearranging the gears forming a part of the gear train 15. A suitable recording pen 16 is shown for cooperating with the chart in a known manner to produce a record thereon of the particular condition being measured.

After leaving the timing drum 12, the strip chart passes downwardly in a generally vertical direction across a writing table 17, a portion of which is shown in Figure 2 forming the front face of the main frame 7. The direction of movement of the strip chart 4 is indicated by an arrow in Figs. 1, 2 and 3.

Located at the bottom of the main frame 7 and toward the front thereof, is a re-roll spool of conventional design including the centrally disposed shaft 18 to which is affixed at spaced points thereon the spool flanges 19, between which the strip chart is wound. The shaft 18 is suitably journalled for rotation in the main frame 7 and as indicated schematically in Figure 1, the shaft has been shown as extending beyond the flange 19 where it is coupled directly to a small electric motor 21 for continuously furnishing torque thereto. It will be understood, of course, that any suitable means can be utilized to couple the re-roll spool to the motor, the arrangement shown in Figure 1 being solely for the purpose of illustrating that the shaft 18 is coupled to the motor 21. In one commercial form of the invention, no direct coupling is used, but instead the shaft and motor are coupled through a suitable gear train. These arrangements have not been shown, for they form no part of the subject invention, are well known in the art, and have been omitted for the sake of brevity and clarity.

In Figure 2, which is a partial view of the aforesaid commercial form of the invention, it is noted that the shaft 18 does not extend from the spool for direct coupling to the motor (as is shown schematically in Figure 1) but instead has its extremities substantially within the frame 7 and reduced to form a pair of outwardly projecting pins, one of which is shown as 22, for cooperation with suitable mounting slots 23 provided in the main frame 7 whereby the spool is rotatably mounted therein. A lever 24 is also mounted on the frame 7, pivoted with respect thereto, and biased by means of a spring 25 against the pin 22 whereby the re-roll spool is maintained properly in place within the frame 7. This arrangement permits ready and convenient removal of the spool in a known manner simply by moving the lever 24 in a counterclockwise direction away from the pin 22, after which the re-roll spool may be easily lifted out of the bearing provided by the slots 23 in the frame 7. The mounting arrangement of the re-roll spool, together with the mode of furnishing torque to the spool, form no part of the subject invention and, being of conventional design, further details thereof have been omitted for the sake of brevity and clarity.

Located in proximity to the re-roll spool is a pivoted member in the form of an elongated metallic strip 26 extending transversely across the strip chart 4 whereby the chart passes around the central portion thereof, the outer portions of the strip 26 bearing against the flanges 19 of the re-roll spool. The strip 26 may be provided with a pair of in-turned ears 27 provided with suitable apertures for receiving the inner pin-like extremities of a screw 28 that is fastened to the frame 7 and projects inwardly therefrom. The member 26 is free to pivot, but, of course, very little motion is possible in view of the fact that its lower edges rest upon the edges of the flanges 19.

It is seen that the strip chart 4 passes around the elongated member 26 after which it is affixed to the re-roll spool and wound thereon. The affective torque at the spool takes up any slack in the chart between the spool and the timing drum 12 and pulls the chart onto the spool as fast as it completes its travel through the recorder. As the chart is pulled onto the spool, the tension in the chart causes the member 26 to bear against the flanges 19 and exert a braking force thereon. This braking force automatically regulates the effective torque at the re-roll spool which in turn automatically regulates the tension in the strip chart.

Now considering the operation of the braking member at the start of re-roll of the chart 4, as indicated by the dotted position of the paper designated by the letter S in Figure 2, it is seen that the paper makes a relatively sharp angle with respect to the member 26 as it passes underneath it in its travel to the re-roll spool. The effective torque tends to drive the re-roll spool very hard during the start of re-roll in view of the fact that very little paper is on the spool at this point. Since the diameter of the spool shaft 18 is quite small, the tension force developed on the chart is quite large. Without the braking member 26, this force, which exceeds the drag force furnished by spring 11, could cause the chart to jump across the timing drum or it could in some cases cause the chart to rip or tear as it moves through the recorder. However, since the chart directly contacts the braking member 26, the tension force in the chart causes the braking member to be pulled hard against the flanges 19 of the re-roll spool. The braking force thus reduces the effective torque at the re-roll spool and thereby reduces the tension in the chart to the desired magnitude.

As the chart continues to be wound on the re-roll spool, the chart forms a greater angle with respect to the braking member 26, as indicated by the position of the chart designated by the letter F on Figure 2. At this point, a very substantial portion of the chart has been wound on the re-roll spool and a large portion of the effective torque at the re-roll spool is utilized to turn the heavily loaded spool. However, there may still be excess torque creating excess tension and if that is the case, the braking member will again automatically reduce the effective torque so that the tension is reduced to the desired value. However, it is to be noted that since the chart forms a greater angle with respect to the braking member 26, the braking effect has been reduced to automatically compensate for the reduction in excess torque. At the end of the re-roll operation, when practically the entire chart is on the re-roll spool, the regulatory effect of the braking member 26 has been reduced to a minimum.

Another important advantage of the aforesaid arrangement is its regulatory effect upon any changes in torque resulting from excursions of the voltage exciting the motor 21. Since the motor 21 is normally intended to be connected directly to the supply lines, and since the voltage at the supply lines may vary through the range of 108 to 132 volts, it is apparent that the effective torque a the re-roll spool furnished by the motor 21 can vary over a considerable range. If the torque furnished by the motor 21 should so vary, the effective torque at the re-roll spool will be regulated as aforesaid by the operation of the braking member 26.

Thus, it is seen that the arrangement of the braking member permits the strip chart to be essentially self-regulating in view of the fact that the tension in the chart directly actuates the braking member 26 and the braking member in turn directly regulates the effective torque at the re-roll spool. The invention permits the use of a constant drag force at the supply roll and a substantially constant tension at the re-roll spool. The re-roll mechanism can be designed to accommodate strip charts as long as 150 feet without significantly disturbing or affecting the smooth and accurate passage of the chart through the recorder. By automatically compensating for the excessive torque available at the start of re-roll and gradually diminishing this compensating effect as more and more of the chart is wound on the re-roll spool, the tension of the chart at the re-roll spool is automatically regulated to a near constant value, properly and predictably co-related to the drag force at the supply roll and the driving force at the timing drum.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In a strip chart recorder, the combination of a record chart in strip form, means for advancing said strip through said recorder, means for winding said strip into a roll form upon completion of its travel through said recorder, said winding means including a rotatably mounted spool upon which said strip is wound and driving means for supplying continuous torque to said spool, and a pivoted member over which said strip passes just prior to being wound on said spool, said member moving in response to changes in the tension of said strip for directly and continuously regulating the effective torque of said spool during the rotation thereof.

2. In a strip chart recorder, the combination of a record chart in strip form, means for advancing said strip through said recorder, means for winding said strip into a roll form upon completion of its travel through said recorder, said winding means including a rotatably mounted spool upon which said strip is wound and driving means for supplying continuous torque to said spool, and a pivoted member over which said strip passes just prior to being wound on said spool, said member moving in response to changes in the tension of said strip and having a portion thereof bearing directly upon a portion of said spool for directly regulating the effective torque of said spool during the rotation thereof through the braking action of said member upon said spool in response to the tension force in said chart.

3. In a strip chart recorder, the combination of a record chart in strip form, means for advancing said strip through said recorder at a controlled rate including means for guiding said strip in a generally downward direction for a portion of its travel through said recorder, means for winding said strip into a roll form upon completion of said downward portion of travel, said winding means including a rotatably mounted spool upon which said strip is wound and driving means for supplying continuous torque to said spool, and a pivotally mounted member located adjacent said strip at the end of said downward portion of travel thereof, said member having a first portion thereof extending across said strip under which said strip passes in its travel to said spool whereby the tension in said strip tends to move said member about its pivot, said member having a second portion thereof directly contacting said spool for regulating the effective torque of said spool by exerting a braking force thereon during the rotation thereof in response to changes in the tension of said strip.

4. In a strip chart recorder, the combination of a record chart in strip form, means for advancing said strip through said recorder at a controlled rate including means for guiding said strip in a generally downward direction for a portion of its travel through said recorder, means for winding said strip into a roll form upon completion of said downward portion of travel, said winding means including a rotatably mounted spool provided with annular flange members at its opposite ends between which said strip is wound and driving means for supplying continuous torque to said spool, and a pivotally mounted elongated braking member located adjacent said strip at the end of said downward portion of travel thereof, said member extending across said strip and having its outer edges adapted to bear against the edges of said spool flanges, said strip passing under said braking member as it travels to said spool whereby the tension in said strip tends to move said braking member about its pivot, said braking member bearing upon said flanges to regulate the effective torque of said spool during the driving thereof in response to changes in the tension of said strip.

5. The combination defined by claim 4 wherein the braking member is positioned relative to said spool such that the angle between said strip before and after passing said braking member changes as said strip is wound in said spool such that the tendency of said strip to move said breaking member diminishes steadily as said strip is wound in said spool.

6. In a strip chart recorder including a record chart in strip form, means for advancing said strip, and means for guiding said strip in a generally downward direction, improved means for automatically regulating the tension of said strip comprising in combination: means for guiding said strip around a pivoted member upon completion of said downward travel, and means for winding said strip into a roll form upon completion of its travel through said recorder, said last named means including a rotatably mounted spool having flanged ends and torque-producing driving means for said spool, said pivoted member having portions thereof bearing on said flanges to impose a braking force thereon, said pivoted member tending to move in response to changes in the tension of said strip to automatically impose variable braking forces on said flanges during the rotation of said spool.

7. In a strip chart recorder, the combination of a record chart in strip form initially formed into a rotatably mounted chart supply roll, means for unwinding said strip chart from said supply roll including a rotatably mounted timing drum for advancing said strip chart through said recorder and driving means for furnishing substantially constant torque to said timing drum, means for imposing a substantially constant drag force on said strip chart as it is unwound from said supply roll, means for winding said strip into a roll form upon completion of its travel through said recorder, said winding means including a rotatably mounted spool upon which said strip is wound and driving means for furnishing torque to said spool, said winding means operating to maintain said strip chart under tension as it passes through said recorder, and means responsive to the tension in said strip for regulating the effective torque of said spool during the rotation thereof.

8. The combination defined by claim 7 wherein the effective torque of said winding spool is reduced in response to an increase in tension in said strip.

9. The combination defined by claim 8 wherein the torque regulating effect of said tension responsive means steadily decreases as said strip is wound up on said spool.

10. The combination defined by claim 9 wherein said tension responsive means is in the form of a pivoted braking member having one portion thereof in constant contact with said strip and another portion thereof in constant contact with a portion of said spool whereby said strip directly actuates said braking member and said braking member directly regulates the effective torque of said spool.

References Cited in the file of this patent

UNITED STATES PATENTS

| | | |
|---|---|---|
| 1,302,803 | Jenkins | May 6, 1919 |
| 1,664,467 | Roeske | Apr. 3, 1928 |
| 1,913,176 | Twiss | June 6, 1933 |
| 2,097,592 | Gibbs | Nov. 2, 1937 |
| 2,199,594 | Kent | May 7, 1940 |

FOREIGN PATENTS

| | | |
|---|---|---|
| 621,658 | France | Feb. 12, 1927 |